Dec. 12, 1967     E. AAKJAR     3,357,661

ADJUSTABLE POSITIONING DEVICE

Filed Oct. 23, 1965

INVENTOR
ELMER AAKJAR
BY
ATTORNEY

United States Patent Office 3,357,661
Patented Dec. 12, 1967

3,357,661
ADJUSTABLE POSITIONING DEVICE
Elmer Aakjar, 1 Maurice Ave., Ossining, N.Y. 10562
Filed Oct. 23, 1965, Ser. No. 502,888
2 Claims. (Cl. 248—23)

ABSTRACT OF THE DISCLOSURE

An assembly for adjustably positioning two members having registrable openings relative to each other and formed of an elongate headed bolt element extending through the registrable openings and having a nut element threadedly engageable with the extending end thereof and an eccentric member provided with an accessible tool engaging extension rotatably mounted on the bolt element and engageable in the opening of one of the members to selectively position such member relative to the other member and to secure such members in selected position when clamped by the tightening of said bolt and nut.

---

This invention relates generally to adjustable positioning devices by which two members, one of which may be a fixed reference member or support, may be readily and simply adjustably positioned relative to each other and then secured together in such relative position.

An object of this invention is to provide adjustable positioning devices which are relatively simple and inexpensive to manufacture and which may be employed in a wide variety of mechanical assemblies to permit relative positional adjustment of members of such assemblies either during installation or operation in a simple and readily facile manner.

In accordance with a broad aspect of this invention, a device for adjustably positioning a first member or article relative to a second member which may constitute a fixed support or reference member, comprises a shaft-like element fixedly positionable with respect to the referance member for defining a reference axis, selectively positionable eccentric means rotatably mounted on the shaft-like element, tool engageable means for effecting selected positioning of the eccentric means relative to the shaft-like member and article locating follower means disposed in abutting relation with the eccentric means and selectively positioned with respect to the reference axis in accordance wih the selective positioning of the eccentric means on the shaft-like element.

In preferred embodiments of this invention, the shaft-like element extends through registrable openings of the members which are to be adjustably positioned relative to each other and forms part of fastening means by which the two members may be secured together in selected positional relation upon tightening of the fastening means, and the article locating follower means disposed in abutting relation with the eccentric means is constituted by a portion of one of the members which extends around the opening therein receiving the shaft-like element. In the illustrated embodiments of the invention, the shaft-like element is in the form of a bolt having a head at one end, and the fastening means further includes a nut threadably engageable with the bolt so that, upon tightening of the nut, the eccentric means which is rotatably mounted on the bolt between its head and the nut, is clamped in its selected position for securely holding the adjustably positioned members against relative displacement.

The above, and other objects, features and advantages of the invention, will be apparent in the following detailed description of illustrative embodiments thereof which is to be read in connection with the accompanying drawing forming a part hereof, and wherein.

Figure 1:
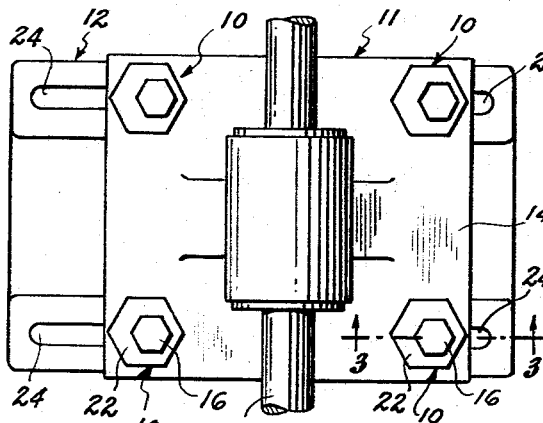
FIG. 1 is a top plan view showing adjustable positioning devices in accordance with one embodiment of this invention employed for fastening a bearing bracket or block for a shaft to a support structure.
Figure 2:
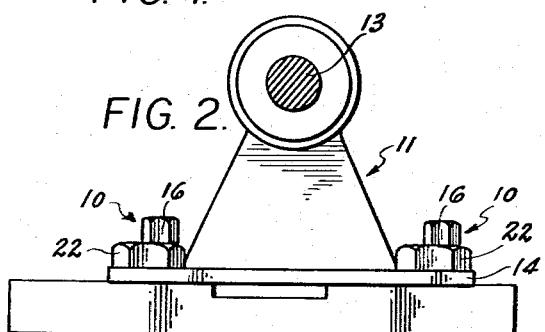
FIG. 2 is a side elevational view of the arrangement shown on FIG. 1.

Referring to the drawing in detail, and initially to FIGS. 1 and 2 thereof, it will be seen that adjustable positioning devices 10 embodying this invention are there shown employed for attaching or securing a first member or article 11 to a second member 12 which may be a fixed supporting structure or reference member. The member 11 is shown in the form of a bearing block or bracket in which a shaft 13 is journaled, and the purpose of the adjustable positioning devices 10 is to permit the positional adjustment of the bearing bracket 11 relative to the fixed supporting structure 12 in order to achieve accurate alignment of shaft 13 with a device or machine driven thereby or with other components of a mechanical assembly.

In the arrangement shown on FIGS. 1 and 2, the bearing bracket 11 has a substantially rectangular base or mounting plate 14 which is held against the fixed supporting structure 12 by four adjustable positioning devices 10 located near the corners of the rectangular base.

Figure 3:
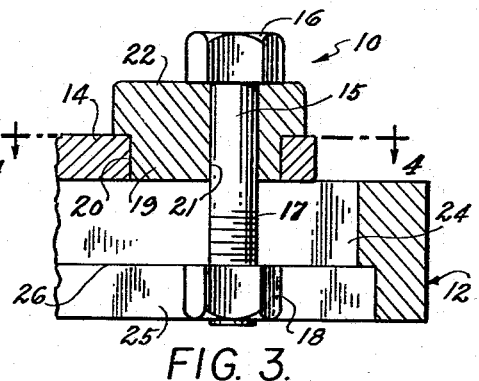
FIG. 3 is an enlarged, fragmentary sectional view taken along the line 3—3 on FIG. 1.

As shown particularly on FIG. 3, each adjustable positioning device 10 includes a shaft-like element 15 which is preferably in the form of a bolt having a head 16 at one end and its other end portion threaded, as at 17, to receive a nut 18. Each device 10 further includes an eccentric element 19 having a cylindrical outer surface 20 and an axial bore 21 which is eccentrically located with respect to cylindrical surface 20 and diametrically dimensioned to receive the shaft-like element or bolt 15 and thereby rotatably mount eccentric element 19 on bolt 15. Formed integral with the eccentric element 19, or otherwise fixedly joined to the latter, is an exposed and accessible hexagonal, or other non-circular tool engageable means 22 which projects axially from the eccentric element and may extend radially beyond the latter, as shown. Such tool engageable means 22 serves as a readily accessible and facile means to receive externally applied forces for effecting rotative displacements of the eccentric element 19 relative to shaft 15.

Figure 4:
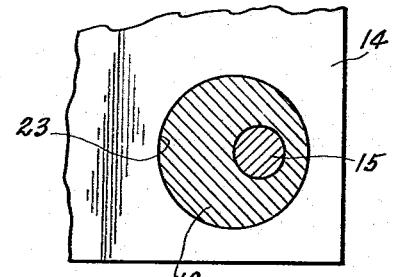
FIG. 4 is a sectional view taken along the line 4—4 on FIG. 3.

In order to accommodate the adjustable positioning devices 10, the base or mounting plate 14 of bearing bracket 11 and the fixed supporting structure or reference member 12 are formed with registrable openings 23 and 24, respectively. As shown particularly on FIG. 4, each opening 23 in base 14 may be circular and diametrically dimensioned to rotatably receive the eccentric element 19 of the respective adjustable positioning device 10. As shown on FIGS. 1 and 3, each opening 24 of the fixed supporting structure or reference member 12 may be in the form of an elongated slot which is laterally dimensioned to slidably receive the shaft-like element or bolt 15 of the respective adjustable positioning device 10. The lower portion of each slot 24 is undercut or recessed, as at 25 (FIG. 3), to slidably receive the nut 18 and hold the latter against rotation while defining downwardly facing shoulders 26 at the opposite sides of the slot 24 against which the nut 18 can bear.

In using the above described devices 10 for adjustably positioning the bearing bracket or other article 11 relative to the supporting structure or reference member 12, the eccentric element 19 of each device 10 is placed in the related opening 23 of base 14 and the bolt 15 is extended through the bore 21 of the eccentric element and through the respective slot 24 of the supporting structure 12 and then screwed into the nut 18 which is held against rotation in the recess 25. Prior to tightening of bolt 15 and nut 18 relative to each other, a wrench or other tool can be applied to exposed head 22 for turning eccentric element 19 within the respective opening 23 of base 14. It will be seen that the portion of base 14 around each opening 23 constitutes an article locating follower means in abutting relation with the eccentric element. Turning of eccentric elements 19 serves to positionally adjust the bearing bracket or other article 11 relative to the supporting structure or reference member 12 as, for example, in obtaining accurate alignment of the shaft 13 with a driven machine or other component. After the desired positional adjustment has been effected, each nut 18 and bolt 15 are tightened, for example, by applying a wrench or other suitable tool to the exposed bolt head 16 for turning the latter with respect to the non-rotatable nut 18 within the recess 25. Such tightening of each nut 18 relative to its bolt 15 clamps the structure 12 and base 14 between nut 18 and head 22 to secure base 14 in its adjusted position relative to supporting structure 12 and further clamps each eccentric element 19 against turning relative to its shaft-like element or bolt 15.

Although the invention has been described above with particular reference to the adjustable positioning of a bearing bracket with respect to a fixed supporting structure, it is apparent that the adjustably positioned article 11 may be in the form of an electric motor, an axle support or any other mechanical component which needs to be accurately positioned or aligned, either during installation or operation. The possibility of effecting the positional adjustment during operation arises from the fact that mere loosening of each bolt 15 with respect to its nut 18 permits turning of the eccentric element 19 for effecting the adjustment while the article 11 and reference member 12 are still held together by the loosened adjustable positioning devices 10.

Figure 5:
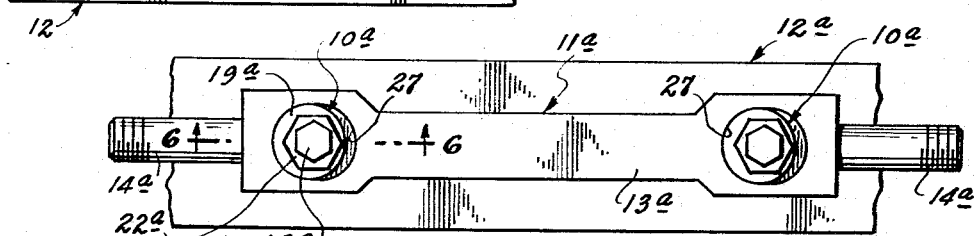
FIG. 5 is a side elevational view illustrating the use of adjustable positioning devices in accordance with another embodiment of this invention for adjustably securing the inner pivot shaft of an automotive front wheel suspension to the frame of the vehicle.
Figure 6:
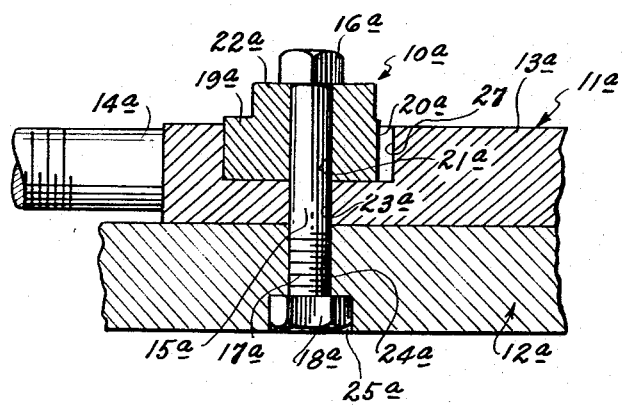
FIG. 6 is an enlarged fragmentary sectional view taken along the line 6—6 on FIG. 5.

Referring now to FIGS. 5 and 6, it will be seen that adjustable positioning devices 10a embodying this invention are there shown employed for adjustably positioning the inner pivot shaft 11a of a conventional automotive front wheel suspension with respect to the automobile frame 12a. In the conventional automotive front wheel suspension, the inner pivot shaft 11a forms the pivotal support for the upper control arm of the suspension so that positional adjustment of the pivot shaft 11a with respect to the adjacent frame 12a is effective to adjust the camber and caster angle, as during alignment of the front end of the vehicle.

As shown, the inner pivot shaft 11a may include an elongated body or bar 13a having threaded spindles 14a projecting axially from its opposite ends to pivotally receive the upper control arm (not shown). The inner pivot shaft 11a is adjustably positioned and secured relative to the frame 12a by means of two adjustable positioning devices 10a located adjacent the opposite ends of the elongated bar 13a.

As in the previously described embodiment of this invention, each adjustable positioning device 10a includes a shaft-like element 15a preferably in the form of a bolt having a head 16a and a threaded end portion 17a for receiving a nut 18a. An eccentric element 19a is provided with a cylindrical outer surface 20a and an axially extending bore 21a which is eccentricaly located relative to the surface 20a and receive the bolt 15a for rotatably mounting the eccentric element on the bolt. The eccentric element 19a further has an integral hexagonal head or extension 22a by which the eccentric element may be turned during adjustment of the device 10a. In the case of the device 10a, the head or extension 22a may lie wholly within the outer perimeter of the eccentric element 19a, as is apparent on FIGS. 5 and 6.

The body 13a and frame 12a have registrable openings 23a and 24a, respectively, for each adjustable positioning device 10a, and the frame 12a further has a recess 25a (FIG. 6) at the side of the frame facing away from the inner pivot shaft 11a to non-rotatably receive the nut 18a.

Figure 7:
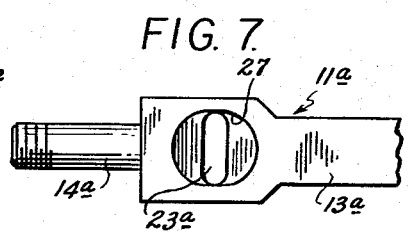
FIG. 7 is a fragmentary elevational view showing one end portion of the inner pivot shaft of FIG. 5.

In the embodiment of the invention presently being described, each opening 24a is in the form of a bore which closely receives the bolt 15a, whereas each opening 23a in the body 13a is in the form of an elongated slot (FIG. 7) slidably receiving the bolt 15a and extending laterally across a generally ellipsoidal recess 27 (FIGS. 5 and 7) formed in the side of bar or body 13a facing away from frame 12a. The recess 27 of the opening 23a is dimensioned to receive the respective eccentric element 19a, so that the portions of bar 13a extending around recesses 27 constitute the follower means for locating or positioning the inner pivot shaft 11a with respect to the frame 12a in accordance with the selective positioning of the eccentric elements 19a on the bolts 15a.

It will be apparent that, when bolt 15a and nut 18a of each device 10a are tightened, the respective eccentric element 19a is clamped between head 16a and the bottom of the respective recess 27 so as to be held against rotation on bolt 15a and further to securely hold the body 13a with respect to the frame 12a. However, upon loosening the bolt and nut of each device 10a, a wrench or other suitable tool can be engaged with the exposed head 22a of the eccentric element 19a for turning the latter and thereby suitably adjusting the position of the inner pivot shaft 11a with respect to the frame 12a for obtaining the desired camber and caster angle of an associated automotive front wheel suspension. Thereafter, the nut and bolt of each device 10a are again tightened relative to each other for securely maintaining the desired adjustment.

In each of the above described embodiments, the head 16 or 16a of the bolt has been exposed for loosening or tightening of each adjustable positioning device 10 or 10a, but it is apparent that the position of the bolt can be reversed, in each case, to dispose the bolt head in the recess 25 or 25a and to expose the nut 18 or 18a for application of a wrench or other tool thereto.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. A device for adjustably positioning two members relative to each other, which members have registrable openings therein, said device comprising fastening means including a bolt element having a transversely extending head at one end and a longitudinal body portion extending through the registrable openings of the two members and a nut element threadedly engageable with the other end of said bolt element, one of said members having a recess around the opening therein sized to non-rotatably receive one of said bolt head and nut to permit securement of said two members upon tightening of said other of said bolt head and nut member, and selectively positionable eccentric means rotatably mounted on said bolt element intermediate said head and nut element and engageable in the opening of the other of the members to selectively position said other member relative to said one member in accordance with the selective positioning of said eccentric means on said bolt element, when said eccentric means is clamped in its selected position by tightening of said fastening means.

2. A device for adjustably positioning two members relative to each other, which members have registrable openings, said device comprising fastening means including a shaft-like element extending through the registrable openings of the two members and a locking element engaging said shaft-like element to secure together the two members upon tightening of said locking element and selectively positionable eccentric means rotatably mounted on said shaft-like element and engageable in the opening of one of the members to selectively position said one member relative to the other member in accordance with the selective positioning of said eccentric means on said shaft-like element, said one member having said eccentric engageable opening therein of elongated nature so that relative adjustment of the two members is effected in directions substantially at right angles to the longitudinal axis of said elongated opening.

References Cited
UNITED STATES PATENTS

| | | | |
|---|---|---|---|
| 1,044,055 | 11/1912 | Johnson et al. | 287—100 |
| 1,125,206 | 1/1915 | Strandlund | 172—754 |
| 2,154,569 | 4/1939 | Hicks | 280—96.2 |
| 2,216,208 | 10/1940 | Michon | 83—701 |
| 2,371,835 | 3/1945 | McNamara | 280—103 |
| 2,556,767 | 6/1951 | McCann | 52—732 |
| 3,072,423 | 1/1963 | Charlton | 287—20 |

ROY D. FRAZIER, *Primary Examiner.*

CHANCELLOR E. HARRIS, *Examiner.*

F. D. DOMOTOR, *Assistant Examiner.*